US012062033B2

(12) United States Patent
Trivelpiece et al.

(10) Patent No.: US 12,062,033 B2
(45) Date of Patent: Aug. 13, 2024

(54) SYSTEMS AND METHODS FOR AN ANONYMIZED TRACKING SERVICE

(71) Applicant: Johnson Controls Technology Company, Auburn Hills, MI (US)

(72) Inventors: Craig E. Trivelpiece, Mission Viejo, CA (US); Timothy C. Gamroth, Dousman, WI (US); Michael Paolella, Lake Zurich, IL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 824 days.

(21) Appl. No.: 16/555,884

(22) Filed: Aug. 29, 2019

(65) Prior Publication Data

US 2021/0065155 A1 Mar. 4, 2021

(51) Int. Cl.
*G06Q 20/32* (2012.01)
*H04W 12/02* (2009.01)
*H04W 12/06* (2021.01)
*H04W 12/63* (2021.01)

(52) U.S. Cl.
CPC .......... *G06Q 20/326* (2020.05); *H04W 12/02* (2013.01); *H04W 12/06* (2013.01); *H04W 12/63* (2021.01)

(58) Field of Classification Search
CPC ....... G06Q 30/02; G06Q 20/326; H04W 4/10; H04W 12/0027; H04W 12/63; H04W 12/02; H04W 12/06; H04W 4/029; H04W 12/71
USPC ........................................................ 455/411
See application file for complete search history.

(56) References Cited

U.S. PATENT DOCUMENTS

| 8,676,657 | B2 | 3/2014 | Fenton |
| 8,947,513 | B2 | 2/2015 | Ganick et al. |
| 9,286,776 | B1 * | 3/2016 | Morton .................. H04W 4/029 |
| 9,664,510 | B2 * | 5/2017 | Nathan ................... G06V 20/52 |

(Continued)

FOREIGN PATENT DOCUMENTS

| CN | 108834196 A | * | 11/2018 | ............ H04W 48/08 |
| WO | WO-2013116816 A1 | * | 8/2013 | ............ G06Q 30/02 |

(Continued)

OTHER PUBLICATIONS

Hong, et al. CN108834196A Machine generated English translation. (Year: 2018).*

*Primary Examiner* — Mahendra R Patel
(74) *Attorney, Agent, or Firm* — Foley & Lardner LLP

(57) ABSTRACT

The present disclosure describes devices and methods for an anonymized tracking service. In particular, devices and methods are described for a third party system that allows a user to selectively opt-in to wireless location tracking at specific stores. The anonymized tracking service may include a third party, a third party server system, a mobile device, and one or more store computing systems. In one aspect, a third-party (e.g., not associated with a store) mobile application may be downloaded onto a mobile device of a user. The mobile application provides a central control unit that allows the user to select which stores have permission to track the location of the user within a building associated with the store. In some embodiments, the central control unit may also allow a user to select which type or how much additional information the store may collect and save.

18 Claims, 9 Drawing Sheets

(56) References Cited

U.S. PATENT DOCUMENTS

| | | | |
|---|---|---|---|
| 9,674,154 B1* | 6/2017 | Canavor | H04W 12/02 |
| 9,763,047 B1* | 9/2017 | Chakra | H04W 4/023 |
| 10,278,065 B2* | 4/2019 | Stuber | G06F 9/452 |
| 10,354,262 B1* | 7/2019 | Hershey | H04L 67/535 |
| 10,509,920 B2* | 12/2019 | Barday | G06F 16/113 |
| 10,530,875 B2* | 1/2020 | Niewczas | H04L 51/52 |
| 10,917,739 B1* | 2/2021 | McIntyre | H04W 4/027 |
| 2011/0029359 A1* | 2/2011 | Roeding | G06Q 30/0238 |
| | | | 705/14.1 |
| 2012/0084151 A1* | 4/2012 | Kozak | G06Q 30/02 |
| | | | 705/14.58 |
| 2012/0084349 A1* | 4/2012 | Lee | H04L 67/025 |
| | | | 709/203 |
| 2012/0182172 A1 | 7/2012 | Sorensen | |
| 2012/0331567 A1* | 12/2012 | Shelton | G06Q 10/00 |
| | | | 726/28 |
| 2013/0054357 A1* | 2/2013 | Mager | G06Q 30/02 |
| | | | 705/14.49 |
| 2013/0268357 A1* | 10/2013 | Heath | G06Q 30/02 |
| | | | 705/14.53 |
| 2013/0317916 A1 | 11/2013 | Gopalakrishnan et al. | |
| 2014/0045536 A1* | 2/2014 | Sydir | H04W 4/021 |
| | | | 455/456.5 |
| 2014/0130140 A1* | 5/2014 | Abhyanker | G06Q 30/02 |
| | | | 726/4 |
| 2014/0195380 A1* | 7/2014 | Jamtgaard | G06Q 30/0601 |
| | | | 709/224 |
| 2014/0266585 A1* | 9/2014 | Chao | G07C 9/27 |
| | | | 340/5.61 |
| 2015/0018011 A1 | 1/2015 | Mendelson | |
| 2015/0050922 A1* | 2/2015 | Ramalingam | H04W 4/50 |
| | | | 455/418 |
| 2015/0199523 A1* | 7/2015 | Hamilton | G06F 21/6245 |
| | | | 726/27 |
| 2015/0228004 A1* | 8/2015 | Bednarek | G06Q 30/0633 |
| | | | 705/26.8 |
| 2015/0281167 A1* | 10/2015 | Seddon | H04W 12/30 |
| | | | 370/331 |
| 2015/0302475 A1 | 10/2015 | Zachariah et al. | |
| 2016/0034924 A1 | 2/2016 | Sorenson | |
| 2016/0127931 A1* | 5/2016 | Baxley | G06T 7/60 |
| | | | 455/67.16 |
| 2016/0171547 A1* | 6/2016 | Sjolund | G06Q 30/0264 |
| | | | 705/14.58 |
| 2016/0328577 A1* | 11/2016 | Howley | G16H 20/60 |
| 2017/0149741 A1* | 5/2017 | Hallett | H04L 61/6022 |
| 2017/0169440 A1 | 6/2017 | Dey et al. | |
| 2017/0243235 A1 | 8/2017 | Garel et al. | |
| 2017/0308911 A1 | 10/2017 | Barham et al. | |
| 2017/0351388 A1* | 12/2017 | Grunewald | H04M 1/72406 |
| 2018/0225714 A1* | 8/2018 | Lewis | G06Q 30/0261 |
| 2018/0248871 A1* | 8/2018 | Tsirkin | H04W 12/06 |
| 2019/0043122 A1 | 2/2019 | Chin et al. | |
| 2019/0102783 A1* | 4/2019 | Sanjay | G06Q 30/0201 |
| 2019/0205936 A1 | 7/2019 | Lal et al. | |
| 2019/0221083 A1* | 7/2019 | Grant | G08B 21/0277 |
| 2019/0230472 A1 | 7/2019 | Raji et al. | |
| 2019/0258818 A1* | 8/2019 | Yu | G06F 21/44 |
| 2020/0336551 A1* | 10/2020 | Knox | H04L 63/0407 |

FOREIGN PATENT DOCUMENTS

| | | | | |
|---|---|---|---|---|
| WO | WO-2016109816 A1 * | 7/2016 | | H04L 61/2015 |
| WO | WO-2018170183 A2 * | 9/2018 | | G01S 11/06 |

* cited by examiner

SYSTEMS AND METHODS FOR AN ANONYMIZED TRACKING SERVICE

BACKGROUND

Consumers today often desire to be tracked during their everyday activities if the service that tracks them offers some benefit. In particular, some retail customers may prefer to be tracked while the customer is within particular retail stores in order to receive targeted discounts, coupons, or notifications based on a determination by the store computing system. However, without first opting in, consumers may feel as though they are sacrificing too much private information without receiving any benefit. In the interest of privacy, some technology companies have implemented security protocols on mobile devices that randomize media access control (MAC) addresses and prevent unauthorized tracking. Furthermore, some government regulations may prohibit unauthorized tracking of mobile devices and prohibit other forms of tracking a consumer without first receiving permission. To address these issues, it would be desirable to provide an application that allows for seamless authentication of particular entities to track a customer while balancing privacy interests with customers' desire for the benefits that customer tracking can provide.

SUMMARY

Various embodiments disclosed herein are related to an anonymized tracking service system. In some embodiments, the system includes a computing system of an entity, a third party server system, and a mobile device. The third party server system is a server system (e.g., computing system) that is not owned or controlled by the entity or the owner of the mobile device and is configured to provide an anonymized, secure, and central tracking service. In one implementation, the third party server system is configured to receive location information regarding a mobile device of a user, determine the location of the mobile device to be in a building associated with an entity, access a user profile associated with the mobile device, generate a security recommendation for the mobile device based on preferences in the user profile and the entity, and transmit the security recommendation to the mobile device. The security recommendation is configured to cause the mobile device to adjust the security settings of the mobile device. In some embodiments, the security recommendation includes proxy Wi-Fi credentials configured to allow the mobile device to access a wireless local area network (WLAN) of the entity.

In some embodiments, the preferences indicate that the user has opted to not be tracked by the entity, and wherein the security recommendation for the mobile device comprises proxy Wi-Fi credentials configured to allow the mobile device access to a wireless local area network associated with the entity.

In some embodiments, the proxy Wi-Fi credentials are configured to anonymize the mobile device from being tracked by the entity. In some embodiments, the security recommendation further comprises instructions to that prevent the mobile device from randomizing a media access control (MAC) address of the mobile device.

In some embodiments, the third party server system is further configured to determine an identity of the entity, cross-reference the identity of the entity in the user profile to determine preferences pertaining to the entity, and implement the preferences pertaining to the entity to create the security recommendation.

In some embodiments, the third party server system is further configured to receive the processing circuit from, tracked location information of the mobile device within the building from a computing system associated with the entity, update the user profile based on the tracked location information, and transmit information regarding prior location history of the mobile device to a computing system associated with the entity.

In some embodiments, the third party server system is further configured to receive, from a computing system associated with the entity, tracked location information of the mobile device, determine targeted data for the mobile device based on the tracked location information and the entity, and transmit the targeted data to the mobile device, where the targeted data is configured to be displayed on the mobile device.

In some embodiments, the third party server system is further configured to receive, from a computing system associated with the entity, an indication that the user associated with the mobile device has made a purchase, and update the user profile to include information indicating that the purchase was made.

In some embodiments, the third party server system is further configured to receive an indication that the user associated with the mobile device has left the building, and update the user profile to include information indicating that a travel path and time of the mobile device in the building.

In another implementation, the mobile device is configured to communicate with an access point associated with an entity, transmit information regarding the entity to the third party server, receive wireless local area networking (WLAN) proxy credentials from the third party server, access the wireless local area network of the entity via the access point using the proxy credentials, receive targeted data via the access point, and display a graphical user interface that includes the targeted data. In some embodiments, the mobile device is configured to automatically populate the proxy credentials into fields in order to access the WLAN.

In some embodiments, the mobile device is further configured to receive, from the third party server, instructions that prevent the mobile device from randomizing a media access control (MAC) address of the mobile device.

In some embodiments, the mobile device is further configured to receive targeted via the wireless network component, and display, via a graphical user interface of the mobile device, the targeted data. In some embodiments, the mobile device is further configured to automatically use the proxy credentials to request access to the wireless local area network in response to receiving the proxy credentials.

In some embodiments, the targeted data is received from the third party server via a mobile application installed on the mobile device and associated with the third party. In some embodiments, the targeted data is received from a computing system of the entity via a mobile application installed on the mobile device and associated with the third party.

In another implementation, the computing system of the entity is configured to allow access to a mobile device to a wireless local area network of the entity based on received proxy credentials, track the location of the mobile device while the mobile device is within communication range of one or more access points associated with the computing system, transmit the tracked location data of the mobile device and associated proxy credentials, receive information regarding a user associated with the mobile device, and transmit targeted data. The targeted data is configured to be displayed via a graphical user interface on the mobile device.

In some embodiments, the computing system of the entity is further configured to determine the targeted data based on the information regarding the user and the data indicating the location of the mobile device. In some embodiments, the proxy credentials anonymize the user of the mobile device. In some embodiments, the tracking is executed via one or more wireless network components and cameras of the computing system of the entity.

In some embodiments, the processing circuit is configured to determine the location of the mobile device based on a known location of the one or more wireless network components and a determination that the mobile device is in communication with one of more of the wireless network components.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1:
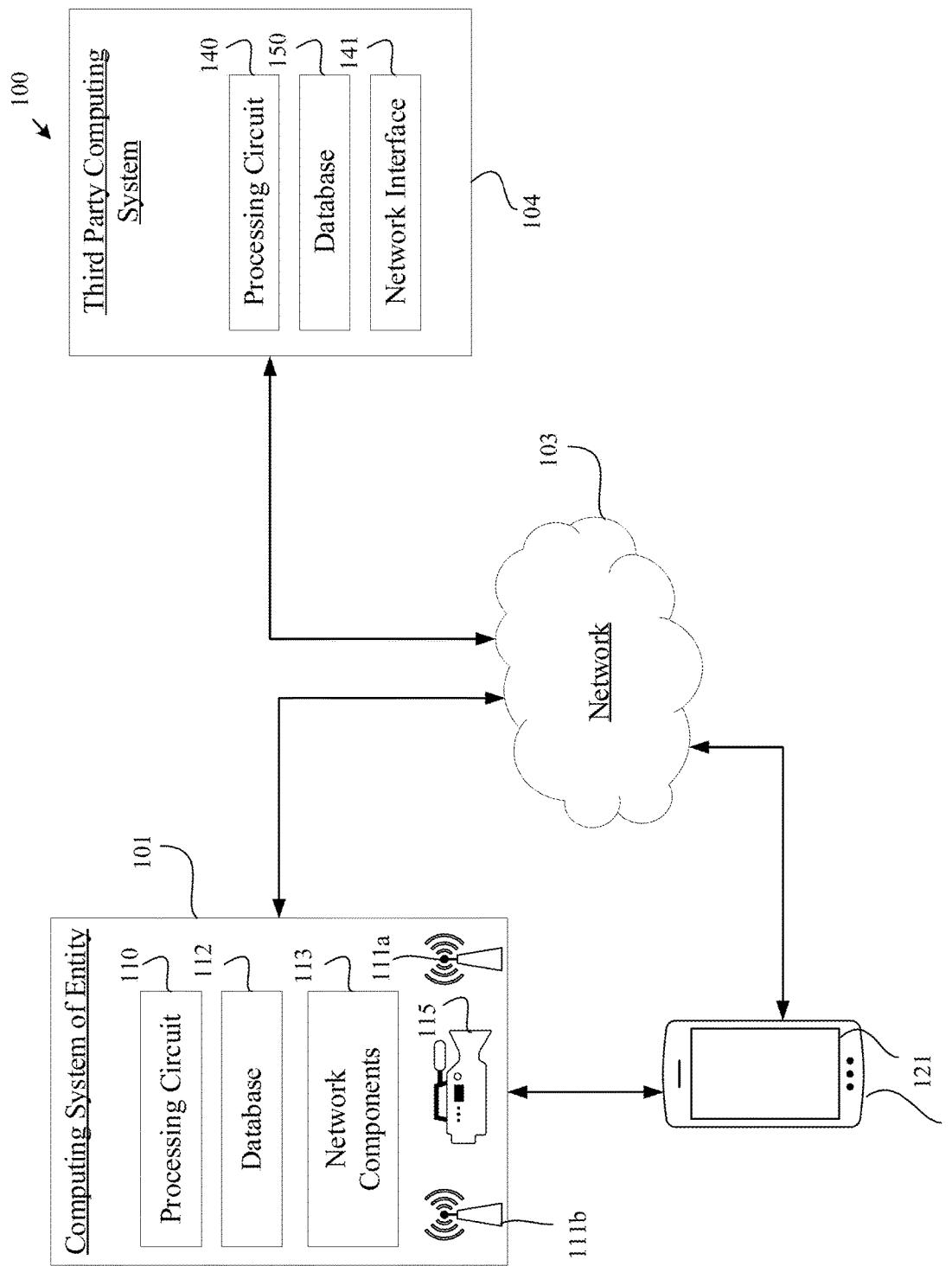
FIG. 1 is a block diagram of an anonymized tracking service, according to some embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

The present disclosure describes devices and methods for an anonymized tracking service. In particular, devices and methods are described for a third party system that allows a user to selectively opt-in to wireless location tracking at specific stores. The anonymized tracking service may include a third party, a third party server system, a mobile device, and one or more store computing systems. In one aspect, a third-party (e.g., not associated with a store) mobile application may be downloaded onto a mobile device of a user. The mobile application provides a central control unit that allows the user to select which stores have permission to track the location of the user within a building associated with the store. In some embodiments, the central control unit may also allow a user to select which type or how much additional information the store may collect and save. For example, additional information may include the user's purchases, purchase price, a travel pattern that the user took throughout the store, the time that the user spent in particular departments, etc. The advantage of the third party application and third part server system allows for a user to control their privacy settings with particularity. Thus, the system enhances security by allowing the mobile device to have strong security defaults (e.g., randomization of media access control addresses) to safeguard against unauthorized tracking, and also allowing the user to selectively send information to particular stores in order to receive benefits therefrom.

FIG. 1 is a block diagram of an anonymized tracking service 100, according to some embodiments. The anonymized tracking service 100 includes a third party server system 104, an entity's computing system 101, a mobile device 102, and a network 103. The network 106 may include wireless networks (e.g., cellular networks, Bluetooth®, Wi-Fi, ZigBee®, Internet, etc.), wired networks (e.g., Ethernet, DSL, cable, fiber-based, etc.), or a combination thereof. The third party server system 104 is the server system that provides the security of the anonymized tracking service. "Third party" is intended to show that the anonymized tracking service and server system 104 is not associated, controlled, or owned by either the customer or the entity (e.g., department store, bank, mall, etc.).

The mobile device 102 is owned by or otherwise associated with a customer/user. The mobile device 102 is structured to enable the user to access the network 106 (e.g., to send and receive information/data over the network). Examples of a mobile device 102 include mobile devices, such as a mobile phone such as a smartphone, a tablet, and a wearable computing devices (e.g., eyewear), a laptop etc. In the example shown, the mobile device 102 is structured as a mobile phone. In other embodiments, the mobile device 102 may be a different computing device, such as a desktop computer. The mobile device 102 includes a processing circuit, memory, a wireless interface, and a network interface.

The mobile device 102 may include program logic stored on the memory and executable by the processing circuit to implement at least some of the functions described herein. In some embodiments, the processing circuit may be configured to download and execute a software application available placed on the mobile device 102. For example, a software developer may make the software application available to be downloaded (e.g., via the developer's website, via an app store, or in another manner). Responsive to a customer selection of an appropriate link, the software application can be transmitted to the mobile device 102 and cause itself to be installed on the mobile device 102. Installation of the software application creates a customer application that is executable by the processing circuit on the mobile device 102 and able to access an online account of the customer provided by the third party, or more particularly, the online account of the user stored in the third party server system 104. In some embodiments, the processing circuit is configured to access other applications on the mobile device such as a web browser. In some embodiments, the software may include instructions to react to information received via the wireless interface. For example, and as explained in detail below, the software may include instructions to determine the entity associated with an access point and send corresponding information via the access point to the entities computing system based on the entity determined. In another example, as also explained below in detail, the software may include instructions to connect to an entity's internal network via an access point with particular safeguards.

The network interface of the customer device 102 may include a one or more various antennas and communications hardware. The network interface is structured too allow the processing circuit of the mobile device 102 to access and connect to the network 103. That is, the network interface 126 is communicably coupled to the processing circuit and memory of the mobile device 102 and configured to communicably couple to the network 103. The network interface allows for the mobile device 102 to transmit and receive internet data and telecommunication data.

The mobile device 102 further includes wireless chip. The wireless chip includes a radio frequency (RF) antenna. In some embodiments, the wireless chip is a Wi-Fi transceiver communicably coupled to the processing circuit 110 and configured to transmit and received data. The wireless chip includes hardware and associated software sufficient to enable the customer device 102 to wirelessly and securely exchange data over short distances (e.g., within a range of a 200 feet or less). In some arrangements, the wireless chip is configured to access the network 106 via a local access point.

The mobile device 102 also includes an input/output device 121. In some embodiments, the input/output device 121 is a touch screen display. In some embodiments, the input/output device 121 is a keyboard with a display. In some embodiments, the input/output device 121 is an audible communication device including a microphone and a speaker. The input/output device 121 is configured to relay information to a user and received information from the user in order to communicate the received information to other systems (e.g., third party server system 104). In one example, the input/output device 121 is a touch screen display configured to display a graphical user interface that depicts information from a third party account of the user. In this example, the graphical user interface may be displayed via a web page on a web browser or via the client application stored on the mobile device 120.

The third party server system 104 includes a processing circuit 140, a database 150, and a network interface 141. The network interface 141 includes sufficient hardware to enable communication via the network 103. The processing circuit 140 includes hardware and software structured to execute the functions of the third party server system 104 as described herein. In some embodiments, the processing circuit 140 may include one or more processing circuits 140. The database 150 is a memory structure that is designed to store information regarding a plurality of users in unique user profiles. In one example, the user profiles include a name of the user, preferences of which entities may tract the user, preferences of what type of information that each entity is to receive regarding the user, and so forth, or a combination thereof. The processing circuit 140 is configured generate new user profiles for new users upon users onboarding from their mobile device 102. Further, the processing circuit 140 is configured to access the user profiles in order to update preferences or to determine what data regarding the user to send to a specific destination. Details of these exact processes are discussed in detail below.

The computing system of an entity 101 includes a processing circuit 110, database 112, and wireless network components 113. In some embodiments, the wireless network components 113 may include a plurality of access point's 111*a-b*, and, in some embodiments, one or more cameras 115. In some embodiments, the wireless network components 113 may include mesh nodes, wireless repeaters, wireless access points, cameras, or a combination thereof in order to generate a wireless local area network (WLAN) for the entity and communicate on the internet via the network 103. The network components 113 may also include a modem, router, and various other hardware components to enable communication within the computing system of the entity 101 and via the network 103. In some embodiments, the processing circuit 110 and database 112 may be local in a building with the access points 111*a-b*. In some embodiments, the processing circuit 110 and database 112 may be located remotely in the cloud and communicate with the access points 111*a-b* (or other wireless network component) and cameras 115 via a local modem (not depicted) and the network 103. The database 112 is configured to store information regarding each user in a user habits profile. The user habits profile may include information regarding the past purchases of the user, frequency that the user enters the store, the amount of time the user spends in the store, the department within the entity that the user spends the most time in, etc. The processing circuit 110 is configured to access the user habits profile and determine whether the user should receive a notification regarding a sale, a coupon, an incentive, location of desired inventory, etc. The processing circuit 110 is also configured to access the user habits profile from the database 112 in order to add information or change information in response to receiving updated information from either the mobile device 102 or the third party server system 104. In some embodiments, the processing circuit 110 is also configured to determine the location of a user within a building associated with the entity based on data received from the mobile device 102 and specific access points 111*a-b* (or other various wireless network components 113.

The plurality of access points 111*a-b* and cameras 115 and various other wireless network components 113 are communicably coupled to the processing circuit 110. The access points 111*a-b* include antennas and associated hardware for digital communication. The plurality of access points 111*a-b* and cameras 115 are disposed of at known positions throughout buildings associated with the entity. The plurality of access points 111*a-b* are configured to communicate wirelessly with the mobile device 102. In some embodiments, the wireless communication therebetween is a Wi-Fi communication. The access points 111*a-b* are configured to receive information from the mobile device 102 and connect the mobile device 102 to the network 103. The cameras 115 may track a user based on a location determined by the processing circuit 110. The processing circuit 110 may determine the location of a user in a building of the entity based on which access point 111*a* is communicating with the mobile device 102.

Figure 2:
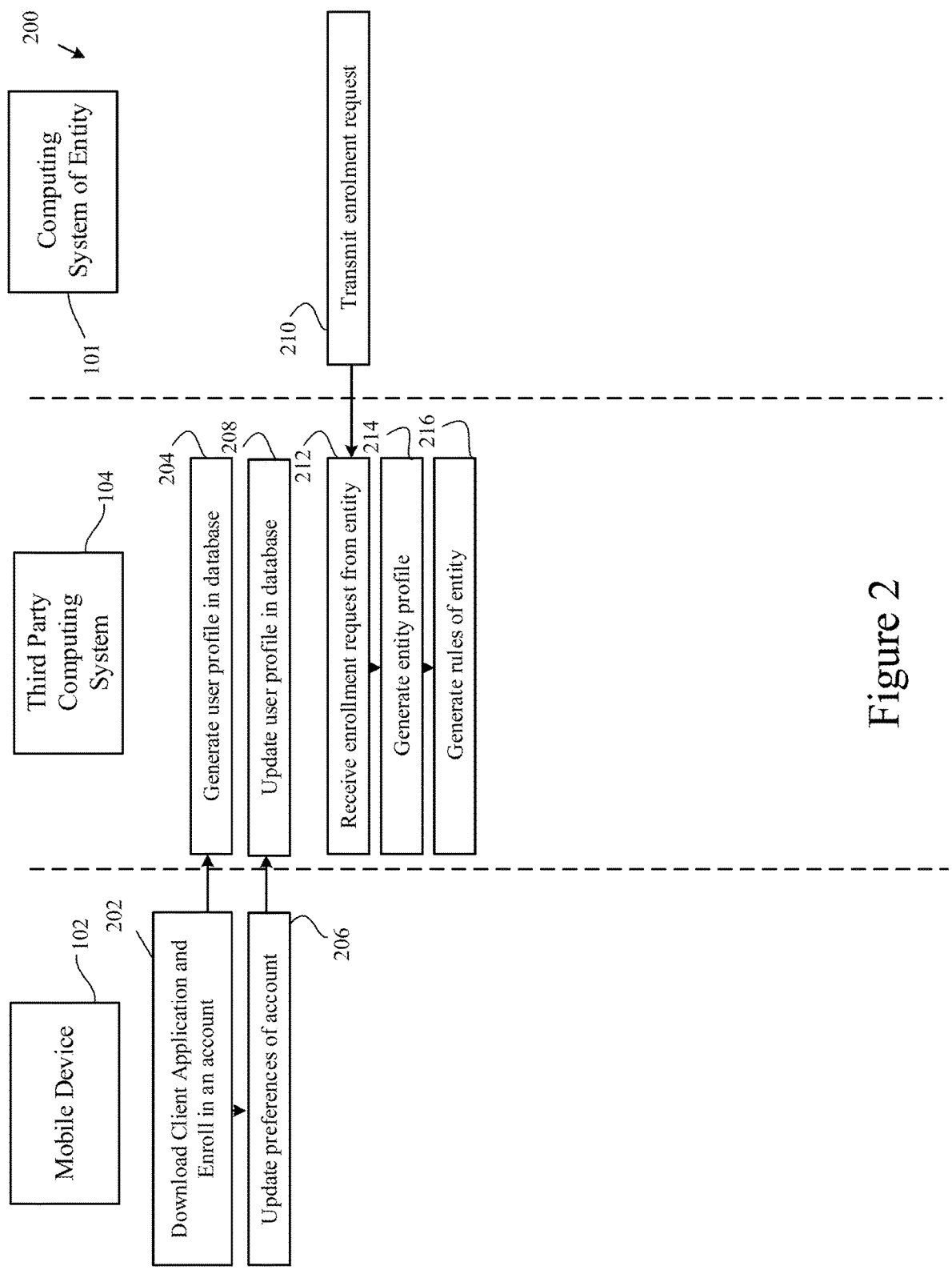
FIG. 2 is a flow diagram depicting a method of anonymized tracking, according to some embodiments.

FIG. 2 is a flow diagram depicting a method of onboarding an anonymized tracking service, according to some embodiments. Because the method 200 may be implemented using the components of FIG. 1, reference may be made to one or more components to aid explanation of method 200. In process 202, a user downloads the third party client application onto the mobile device 102. The third party client application can be launched and ran by the mobile device 102 and corresponding graphical user interfaces may be displayed or communicated via the input/output device 121. The user then accesses the third party client application and enrolls into an account associated with the third party. In process 204, the third party server system receives the enrollment information and generates a user profile corresponding to that user. In some embodiments, the enrollment information may include all preferences of the user and the user profile may be populated accordingly. The user profile may then be stored in the database 150.

At process 206, the mobile device 102 receives as an input from the user an update or change to the preferences to their account. The mobile device 102 is in communication with the third party server system 104 via the network 103 and may display to the user the user profile and corresponding preferences. The user may then enter a change to the user profile via the input/output device 121 and the mobile device 102 may transmit information regarding the change to the third party server system 104. At process 208, in response to receiving the information regarding the change, the third party server system 104 may then update the user profile within the database 112. Process 206 and 208 may be repeated as many times as needed in order for the user to ensure that the user profile is up to date and in accordance with their preferences.

At process 210, an entity transmits a request for enrolment into the anonymized tracking service. In some embodiments, the computing system of the entity transmits the request via a website of the third party. In some embodiments, the entity sends a representative to personally enroll the entity into the anonymized tracking service. At process 212, the third party server system 104 receives the enrolment request from the entity. In some embodiments, the enrolment request includes information regarding the computing system of the entity 101. For example, the enrolment request may include all of the store locations of the entity, the internet protocol (IP) address of the entity, and specific information regarding a tracking system (e.g., access points and cameras) of the entity. At process 214, the third party server system 104 generates an entity profile associated with the entity and stores the entity profile in the database 150. In some embodiments, the third party server system 104 generates rules of the entity that govern the type of information that the third party server system 104 may save, transmit, or receive from the entity. In some embodiments, the rules of the entity include preferences of what type of data/user that the entity is interested in targeting with specific offers or marketing campaigns. Similar to the user onboarding, the rules of the entity and the entity profile may be updated at any time either manually or in response to receiving a request to update the rules or profile. It is to be appreciated that this figure is one example and that many entities may enroll into the anonymized tracking service through similar methods. That is, the third party server system 104 may include entity profiles for hundreds or thousands of entities and users.

Figure 3:
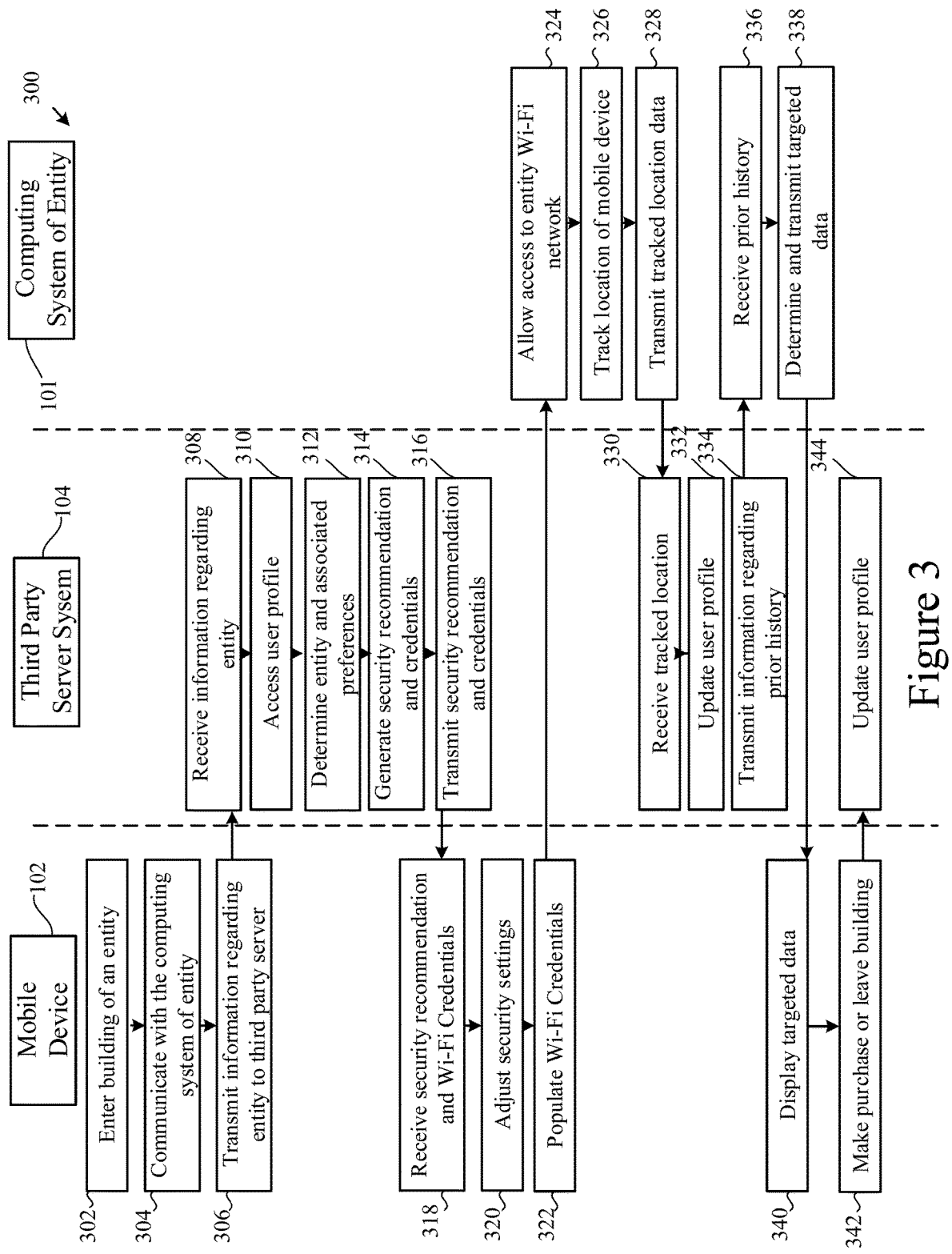
FIG. 3 is a flow diagram depicting a method of anonymized tracking, according to some embodiments.

FIG. 3 is a flow diagram 300 depicting a method of anonymized tracking, according to some embodiments. In process 302, the user and mobile device 102 enter into a building of an entity. In process 304, the mobile device 102 communicates with an access point of the computing system of the entity 101. In some embodiments, the communication may happen automatically as an operation of the operating system of the mobile device 102. In some embodiments, the communication may happen as a result of the user inputting a request to communicate with the computing system of the entity 101. In some embodiments, the third party client application is operating in the background of the mobile device 102 and communicates with the computing system of the entity 101. The communication results in the mobile device 102 receiving information regarding the entity and the computing system of the entity 101. Examples of the information regarding the entity may include an IP address, watermark in the communication, geographic location and so forth. In process 306, the mobile device 102 transmits the received information regarding the computing system of the entity 101 and internetwork to the third party server system 104. The transmission or process 306 may occur automatically in response to receiving the necessary information. That is, the third party client application may detect the received information regarding the entity and automatically cause the mobile device 102 to transmit the information regarding the entity.

In process 308, the third party server system 104 receives the information regarding the entity and determines that the user is located at the associated building. In process 310, the third party server system 104 accesses the user profile associated with the mobile device 102. That is, in some embodiments, the mobile device 102 also transmitted identifying information (e.g., login credentials of the account of the user) so that the third party server system 104 could determine the associated user.

In process 312, the third party server system 104 determines the entity based on the information regarding the entity and also determines the user preferences for the entity stored within the user profile. If the user has not entered preferences that pertain to the entity, then the third party server system 104 may automatically default to a preference of not sharing of information, not connecting to the store Wi-Fi, and continuing to randomize the MAC address of the mobile device 102. In process 314, the third party server system 104 generates a security recommendation and/or Wi-Fi credentials. In some embodiments, where the user preferences indicate that the user does not want the entity to receive any information regarding the user, then the security recommendation may be that the mobile device 102 activates or continues to operate a MAC ID randomization protocol to prevent any tracking. In some embodiments, where the user preferences indicate that the user wants the entity to track the user (e.g., because of the potential discount offerings given to the user), then the security recommendation may be that the mobile device 102 deactivates the MAC ID randomization protocol so that the computing system of the entity 101 can identify the phone as the users and generate or update the user's profile within the database 112. In some embodiments, the third party server system 104 generates Wi-Fi credentials for the user. The Wi-Fi credentials are designed to act a proxy for the mobile device 102 such that the computing system of the entity 101 can track the user and mobile device 102, but cannot create a meaningful user profile because of the proxy (e.g., because of the anonymization). In some embodiments, other credentials for other types of wireless access (e.g., Bluetooth access to a network component 113) may be generated and used. That is, it is to be appreciated that this is only one example of the types of proxy credentials that may be generated for various types of wireless networks or devices.

In process 316, the third party server system 104 transmits the security recommendation and/or Wi-Fi credentials to the mobile device 102. In process 320, the mobile device 102 receives the security recommendation and/or Wi-Fi credentials. In response to receiving, the mobile device 102 automatically adjusts the security settings of the mobile device 102 in accordance with the security recommendation (e.g., enable or disable the MAC randomization). In other embodiments, other settings may be adjusted, or no settings may be adjusted depending on the user's preferences and the entity. In process 322, the mobile device 102 automatically populates the received Wi-Fi credentials and requests for network access from the computing system of the entity 101. In other embodiments, the user may have to input the Wi-Fi credentials into the mobile device 102.

In process 324, the computing system of the entity 101 allows the mobile device 102 access to the Wi-Fi network associated with the entity. The allowed access connects the mobile device 102 to the internet via one of the access point's 111a-b. In process 326, the computing system of the entity 101 tracks the location of the mobile device 102 while the mobile device 102 is in the building of the entity. The computing system of the entity 101 may track the location of the mobile device 102 by department, time spent in each department, path travelled, or by any other metric. In some embodiments, where the security anonymization features of the mobile device 102 has been disabled, the computing system of the entity 101 may update a user purchasing profile stored within the database 112 of the computing system of the entity 101. In this example, the computing system of the entity 101 has permission to track the user and can offer benefits to the user such as offering deals on items that the user purchasing profile indicates are of interest to the user.

In other embodiments, where the security anonymization of the mobile device 102 features are enabled and the mobile device 102 is connected to the Wi-Fi via proxy credentials, the computing system of the entity 101 may track the anonymized mobile device 102 but will not be able to generate a profile connected to the name of the user. In process 328, the computing system of the entity 101 transmits the tracked location of the mobile device 102 to the third party computing system 104.

In process 330, the third party computing system 104 receives the information regarding the tracked location of the mobile device 102. In process 332, the third party server system 104 updates the user profile based on the tracked location of the mobile device 102. The update is again based on preferences entered by the user into the user profile. For example, the user may have a preference that they received targeted coupons based on the time spent in certain departments. The user may want only a certain amount of information stored, so the server system 104 may delete old tracking and store the new information. Thus, the third party server system 104 may save into the user profile the amount of time spent in particular departments within the building of the entity.

In process 334, the third party server system 104 may transmit information regarding the prior history of the user to the computing system of the entity 101. For example information regarding the prior history of the user may include time spent in particular departments of different entities, the number of different but similar entities entered this week, prior transactions at the entity, seasonality purchase information. The prior history to be sent to the computing system of the entity 101 is again a preference of the user stored in the user profile. For example, the user may not mind if all of the purchasing information or tracking information stored in the user profile is shared with the computing system of the entity 101 as long as the computing system of the entity does not know the name of the user and thus cannot build a store profile on them. In this way, the user has enhanced security by only having one profile about him/her stored in a database, while also receiving the benefits of targeted marketing by sharing relevant pieces of his/her location, purchases, or history in an anonymized way.

In process 336, the computing system of the entity 101 receives the prior history information. In process 338, the computing system of the entity 101 determines targeted data and transmits the targeted data to the mobile device 102. In some embodiments, the computing system of the entity 101 transmits the targeted data to the mobile device 102 via the third party server system 104. For example, in some embodiments, the third party server system 104 may act as a buffer or filter between the computing system of the entity 101 and the mobile device. In some embodiments, targeted data may include information on sales, exclusive coupons, clearance information, information on upcoming products, links to products out of stock in the building but available online, etc. In some embodiments, the targeted data is determined based on the prior history of the user. For example, the computing system of the entity 101 may determine a coupon as targeted data because the prior history indicates that the user bought similar items at similar times last year during similar time frames (e.g., seasons).

In process 340, the mobile device 102 receives the targeted data is configured to display the data to the customer. An example of the mobile device displaying the targeted data is shown in reference to FIG. 4. In process 342, the mobile device 102 and the user are either checking out or leaving the building 342. In this process the tracking system of the computing system of the entity 101 determines that the mobile device 102 and/or associated user are making a purchase or have left the store. In an embodiment, the computing system of the entity 101 may determine that the mobile device 102 is making a purchase. The computing system of the entity 101 may determine that a purchase is being made by detecting the location of the mobile device 102 to be at the store checkout location, via cameras 115 that watch the user associated with the mobile device 102 checkout, detected use of a coupon sent as targeted data, or a combination thereof and transmit the information about the purchase to the third party server system 104. Alternatively or additionally, the third party client application may cause the mobile device 102 to transmit information regarding the purchase to the third party server system 104. Alternatively or additionally, the mobile device 102 disconnects from the Wi-Fi and is no longer tracked. In this example, the mobile device 102 disconnects form the Wi-Fi due to manual intervention by the user or because the user left the building. In this example, the security settings of the mobile device 102 are automatically reset to their original setting in response to the disconnection.

In process 344, the third party server system 104 updates the user profile in accordance with the user preferences. In one example, the third party server system 104 may update the user profile with information regarding the tracked location and the purchase, if applicable. In another example, information regarding the purchase is stored for a certain amount of days (e.g., set in the preferences.). It is to be appreciated that FIG. 3 is meant to be an example embodiment for purposes of demonstration. In alternative embodiments, on or more of these processes may be omitted, performed by another one of the computing systems, or performed in different sequences.

Figure 4:
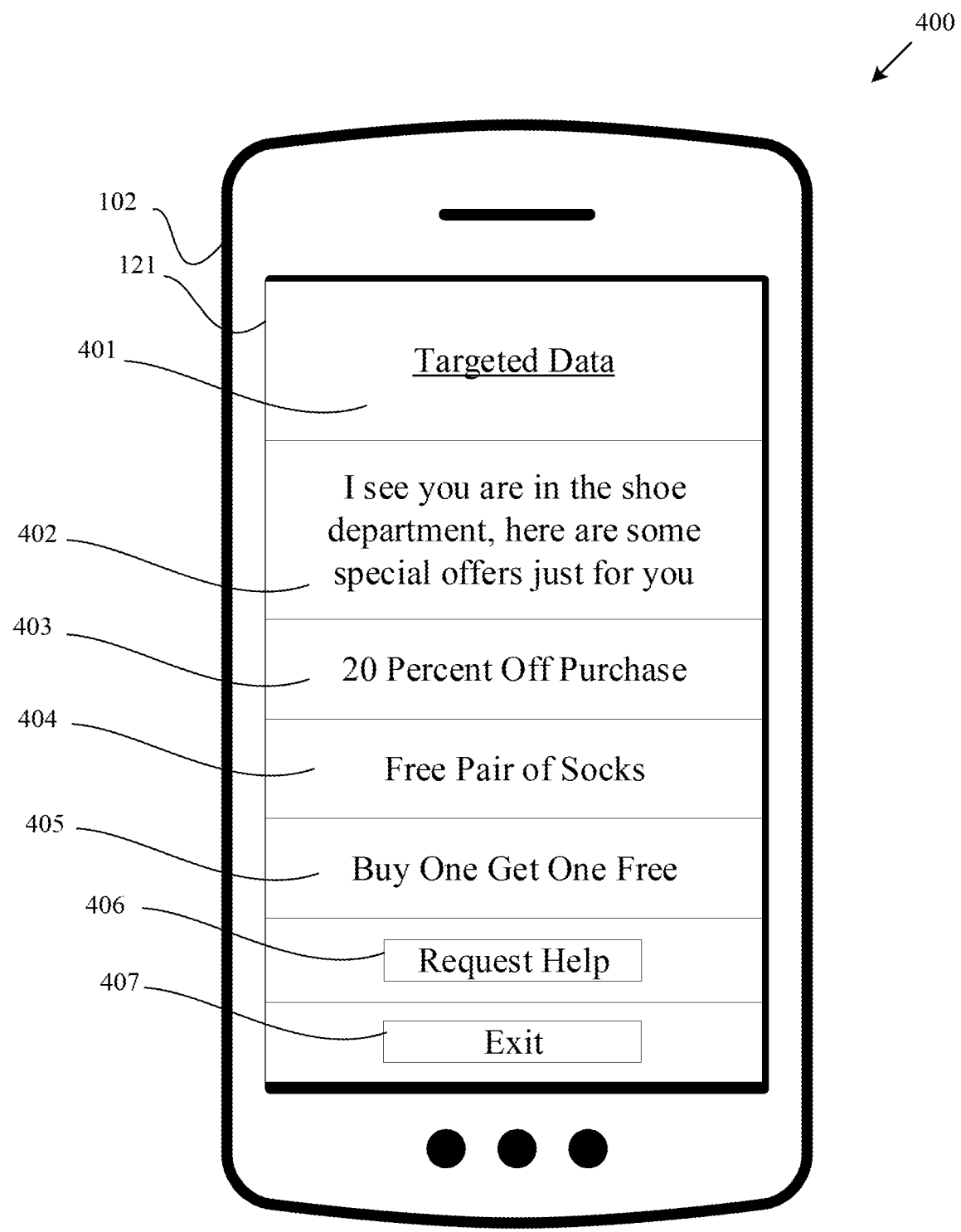
FIG. 4 depicts a mobile device displaying targeted data, according to some embodiments.

FIG. 4 depicts a mobile device displaying a graphical user interface 400, according to some embodiments. The mobile device 102 includes a display 121 depicting the graphical user interface 400. The graphical user interface 400 may be displayed in a web page of a web browser application or a page of a third party client application. The graphical user interface 400 includes targeted data 401. The targeted data 401 includes a message 401, and one or more offers 403, 404, and 405. The one or more offers may include a percentage off 403, an offer of a free product 404, and/or a buy one get one (BOGO) offer 405. In some embodiments, the targeted data 401 may omit the message 402. In some embodiments, more or fewer offers may be displayed. In some embodiments, the targeted data 401 includes more or less information. In some embodiments, each of the one or more offers 403, 404, and 405 are selectable and, when selected, redirect the mobile device 102 to display a bar code, coupon code, or other code that allows the offer to be redeemed. In some embodiments, the code may be unique to the mobile device 102 so that the computing system of the entity 101 can document the sale, forward information regarding the sale to the third party server system 104, and use information regarding the sale and offer for machine learning purposes.

The graphical user interface 400 may also include selectable icons 406 and 407. The selectable icons may include an icon for the user to request assistance 406. The request assistance 406 selectable icon, when selected, may transmit a request with the location of the mobile device 102 to the computing system of the entity 101 that may alert staff to the user in need in the associated location. The selectable icons may also include an icon for exiting 407 the graphical user interface 400. The icon for exiting 407, when selected, causes the mobile device 102 to navigate away from the graphical user interface 400. It is to be appreciated that this figures is one example of many potential embodiments of the mobile device receiving and displaying targeted data based on the user profile and tracked location.

Figure 5:
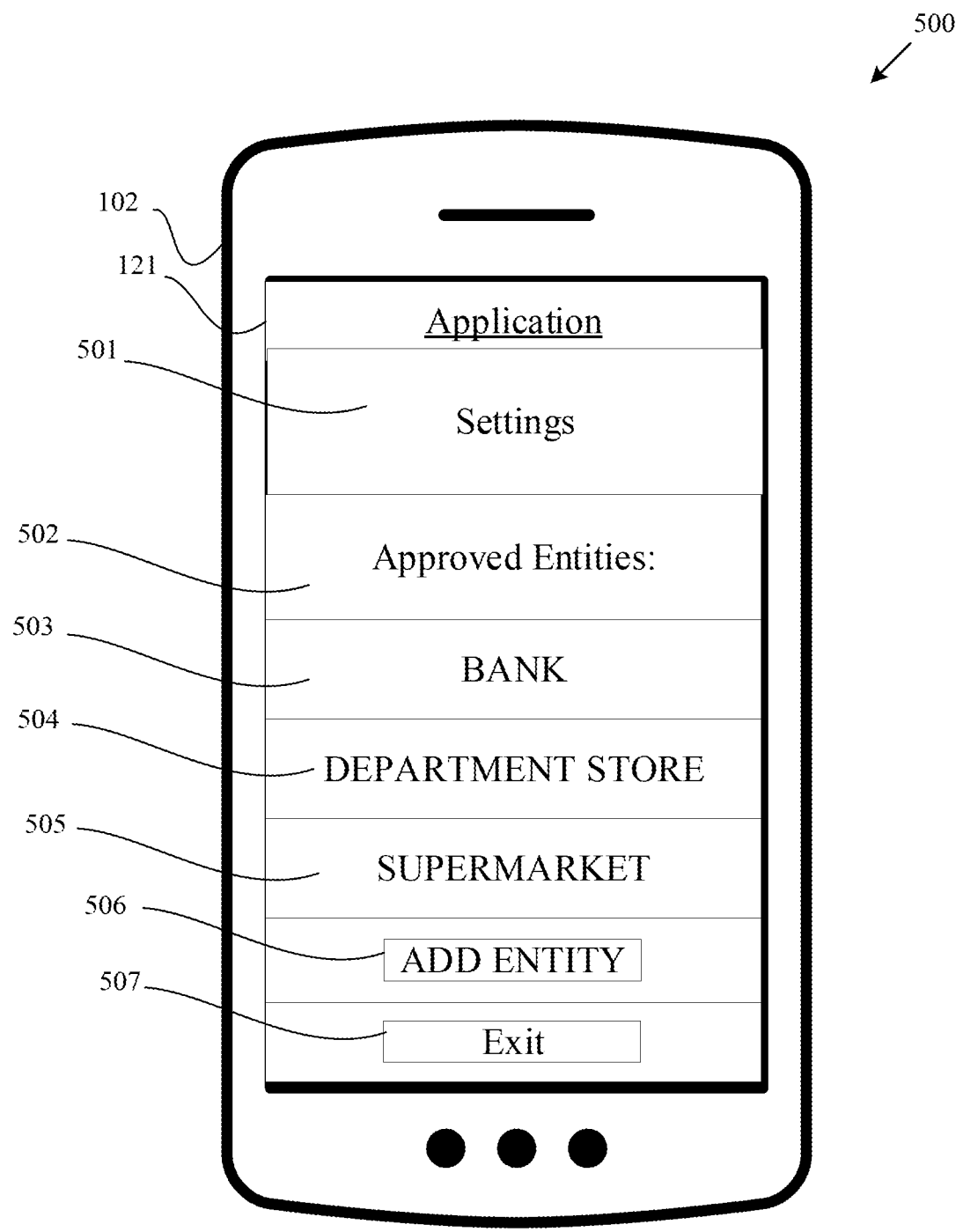
FIG. 5 depicts a mobile device displaying targeted data, according to some embodiments.

FIG. 5 depicts a mobile device displaying a graphical user interface 500, according to some embodiments. The graphical user interface 500 may be displayed as a page of the third party client application. The graphical user interface 500 includes settings 501. The settings 501 include a list of approved entities 502 that are given permission to track the mobile device 102. In one example, the approved entities 502 are a bank 503, a department store 504, and a super market 505. In an embodiment, each of the approved entities 502 are selectable icons that, when selected, re-direct the mobile device 102 to display setting particular to the approved entity selected. In an example, the setting particular to the approved entity selected may include the amount of time that the third party is to save information regarding that entity for, the amount of information the third party server system is to share with that entity, etc. The graphical user interface 500 includes selectable icons. The selectable icons may include an add button 506 and an exit button 507. The add button 506, when selected, causes the mobile device 102 to display a page where the user may search and add entities that are enrolled in the anonymized tracking system in order to add them to the approved entities 502 list of the user. The exit button 507, when selected, causes the mobile device 102 to exit the application.

Figure 6:
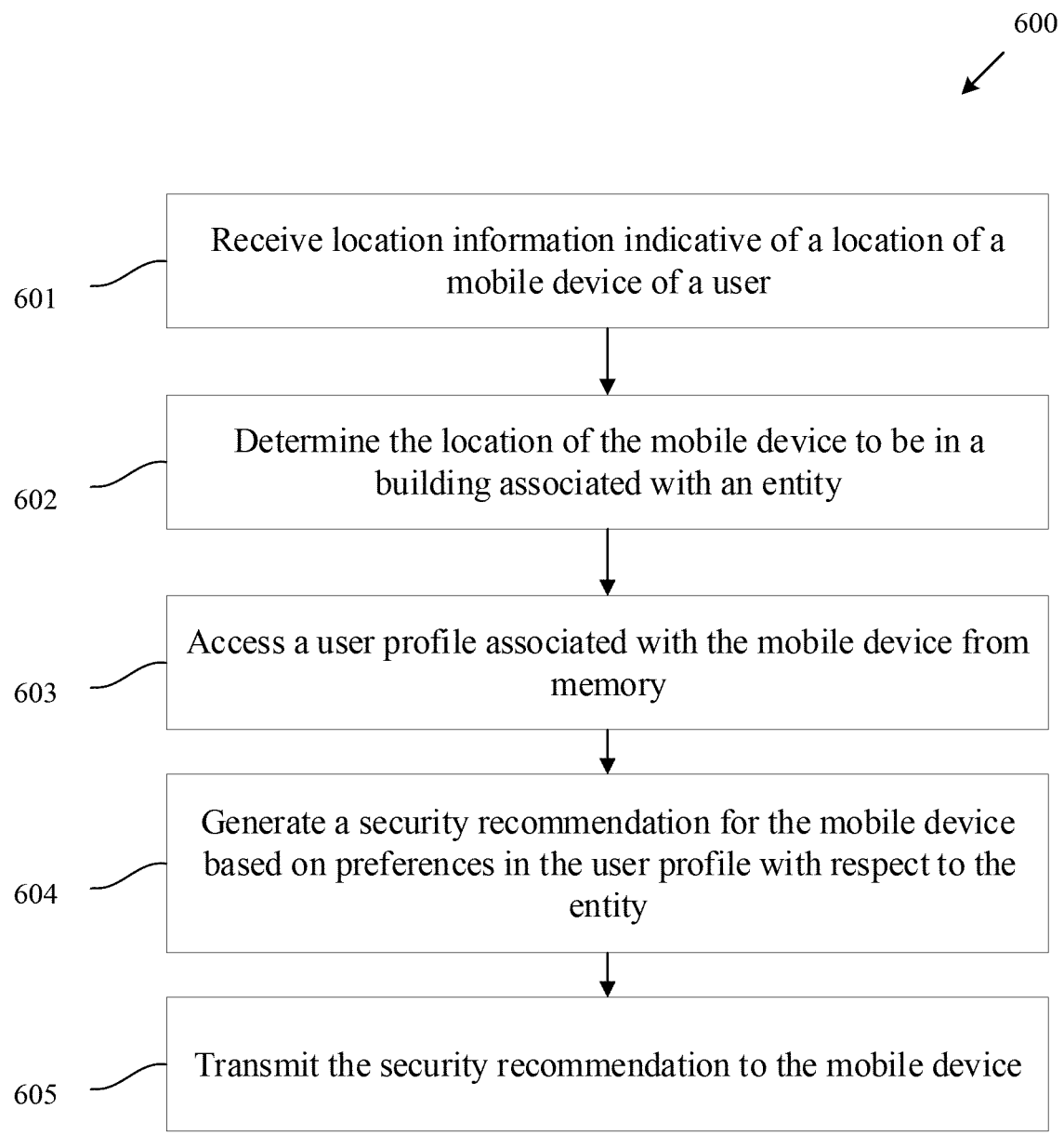
FIG. 6 is a flow diagram depicting a method of anonymized tracking, according to some embodiments.

FIG. 6 is a flow diagram depicting a method of anonymized tracking 600, according to some embodiments. In particular, the method includes a method of anonymized tracking performed by a third party tracking system (e.g., computing system), according to at least one embodiment.

At process 601, a processing circuit of the third party tracking system receives location information indicative of a location of a mobile device of a user. In process 602, the processing circuit determines the location of the mobile device to be in a building associated with an entity. At process 603, the processing circuit of the third party tracking system accesses a user profile associated with the mobile device from memory. At process 604, the processing circuit generates a security recommendation for the mobile device based on preferences in the user profile with respect to the entity. In some embodiments, the processing circuit generates proxy credentials for the mobile device. At process 605, the processing circuit transmits the security recommendation to the mobile device. The security recommendation is configured to cause the mobile device to perform an action. In some embodiments, the action causes the mobile device to adjust one or more security settings stored within the mobile device. In some embodiments, the action causes the mobile device to prompt the user whether to adjust one or more security settings stored within the mobile device. In some embodiments, the action causes the mobile device to adjust one or more security settings stored within the mobile device. In some embodiments, the action causes the mobile device to automatically connect to the wireless local area network of the entity. In some embodiments, the action causes the mobile device to display proxy Wi-Fi credentials to the user. In some embodiments, the action causes the mobile device to prompt the user, via a graphical user interface, whether the user would like to connect to the wireless local area network of the entity using the proxy credentials.

Figure 7:
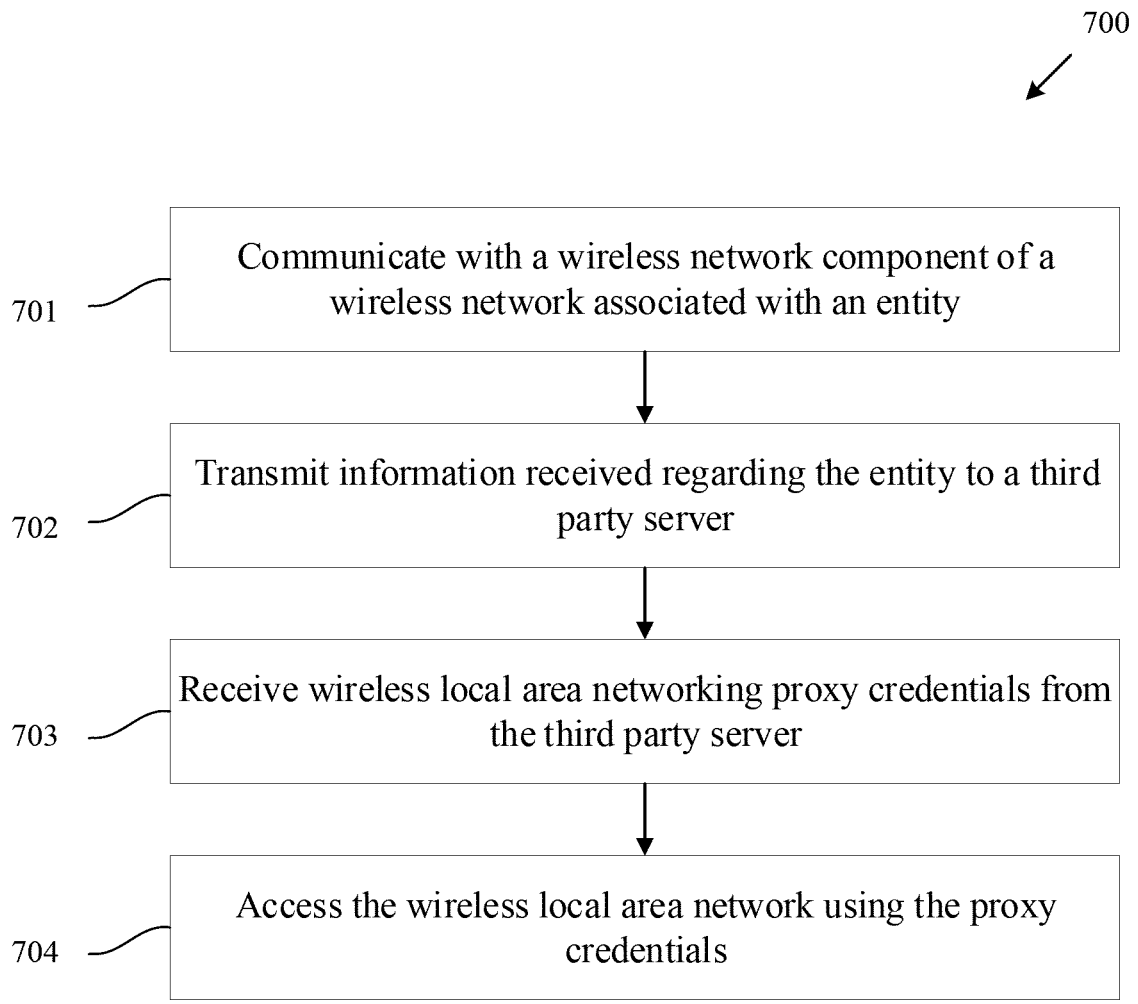
FIG. 7 is a flow diagram depicting a method of anonymized tracking, according to some embodiments.

FIG. 7 is a flow diagram depicting a method of anonymized tracking 700, according to some embodiments. In particular, the method includes a method of anonymized tracking performed by a mobile device associated with a user, according to at least one embodiment. At process 701, the mobile device communicates with a wireless network component of a wireless network associated with an entity. In one example, the wireless network component may be an access point and the network may be a wireless local area network (WLAN). At process 702, the mobile device transmits information received regarding the entity to a third party server. In one example, the transmission is completed via a cellular data connection between the mobile device and a cellular network. In some embodiments, the information received regarding the entity is location data. In some embodiments, the information received regarding the entity is unique identifier of the wireless network (e.g., WLAN).

At process 703, the mobile device receives wireless local area networking proxy credentials from the third party server. At process 704, in response to receiving the proxy credential, the mobile device accesses the wireless local area network using the proxy credentials. In some embodiments, the mobile device accesses the wireless local area network via the wireless network component. In some embodiments, the mobile device accesses the wireless local area network via a second wireless network component. In some embodiments, the mobile device automatically uses the proxy credentials to request access to the wireless local area network in response to receiving the proxy credentials.

Figure 8:
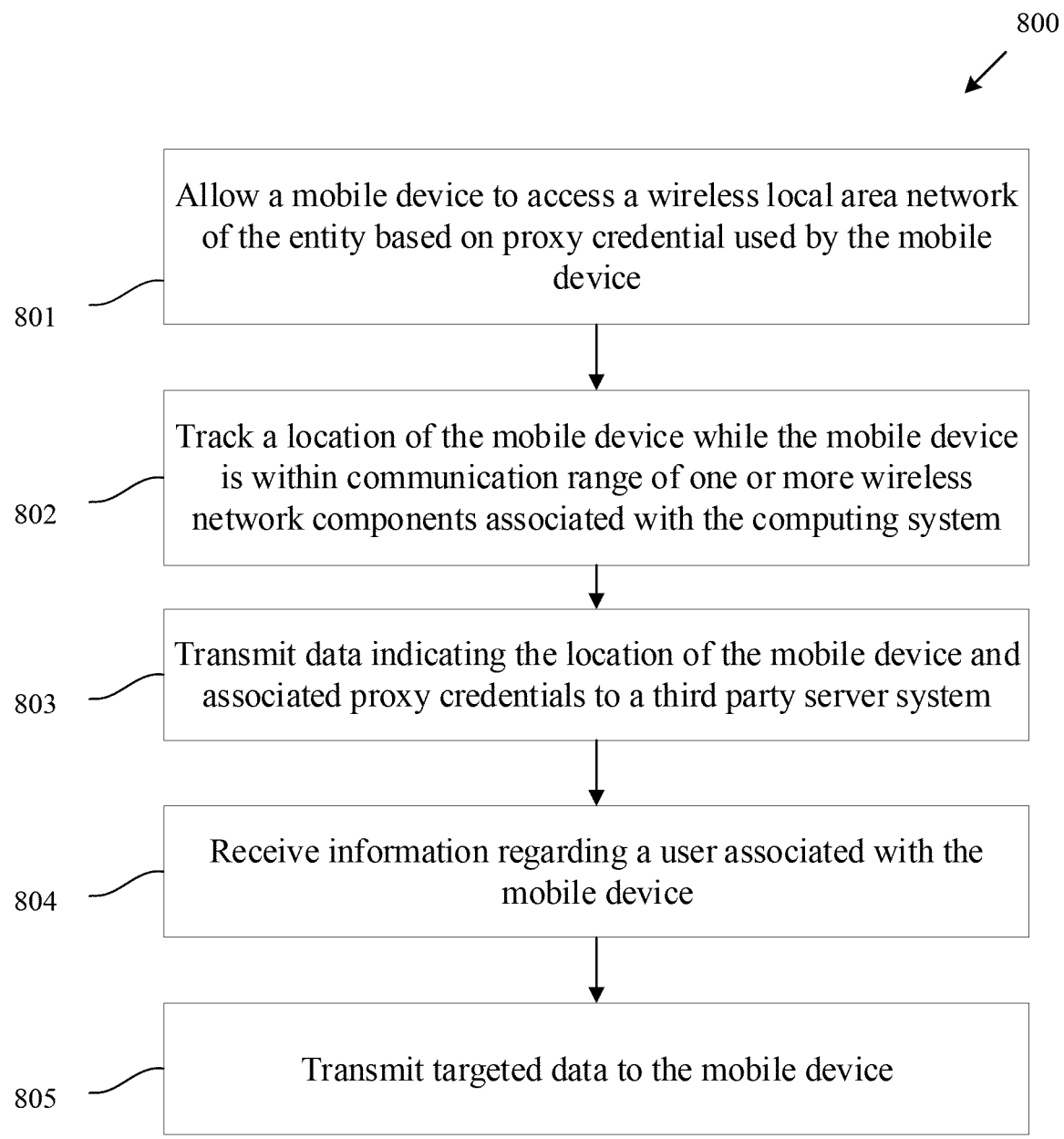
FIG. 8 is a flow diagram depicting a method of anonymized tracking, according to some embodiments.

FIG. 8 is a flow diagram depicting a method of anonymized tracking 800, according to some embodiments. In particular, the method includes a method of anonymized tracking performed by a computing system of an entity, according to at least one embodiment. At process 801, a processing circuit of a computing system of an entity allows a mobile device to access a wireless local area network of the entity based on proxy credential used by the mobile device. At process 802, the processing circuit tracks a location of the mobile device while the mobile device is within communication range of one or more wireless network components associated with the computing system. In some embodiments, the tracking is done via monitoring which of the one or more wireless network components the mobile device is communicating (e.g., connection to the WLAN) with.

At process 803, the processing circuit transmits data indicating the location of the mobile device and associated proxy credentials to a third party server system. At process 804, the processing circuit receives information regarding a user associated with the mobile device. At process 805, the processing circuit transmits targeted data to the mobile device. The targeted data being configured to be displayed via a graphical user interface on the mobile device.

Figure 9:
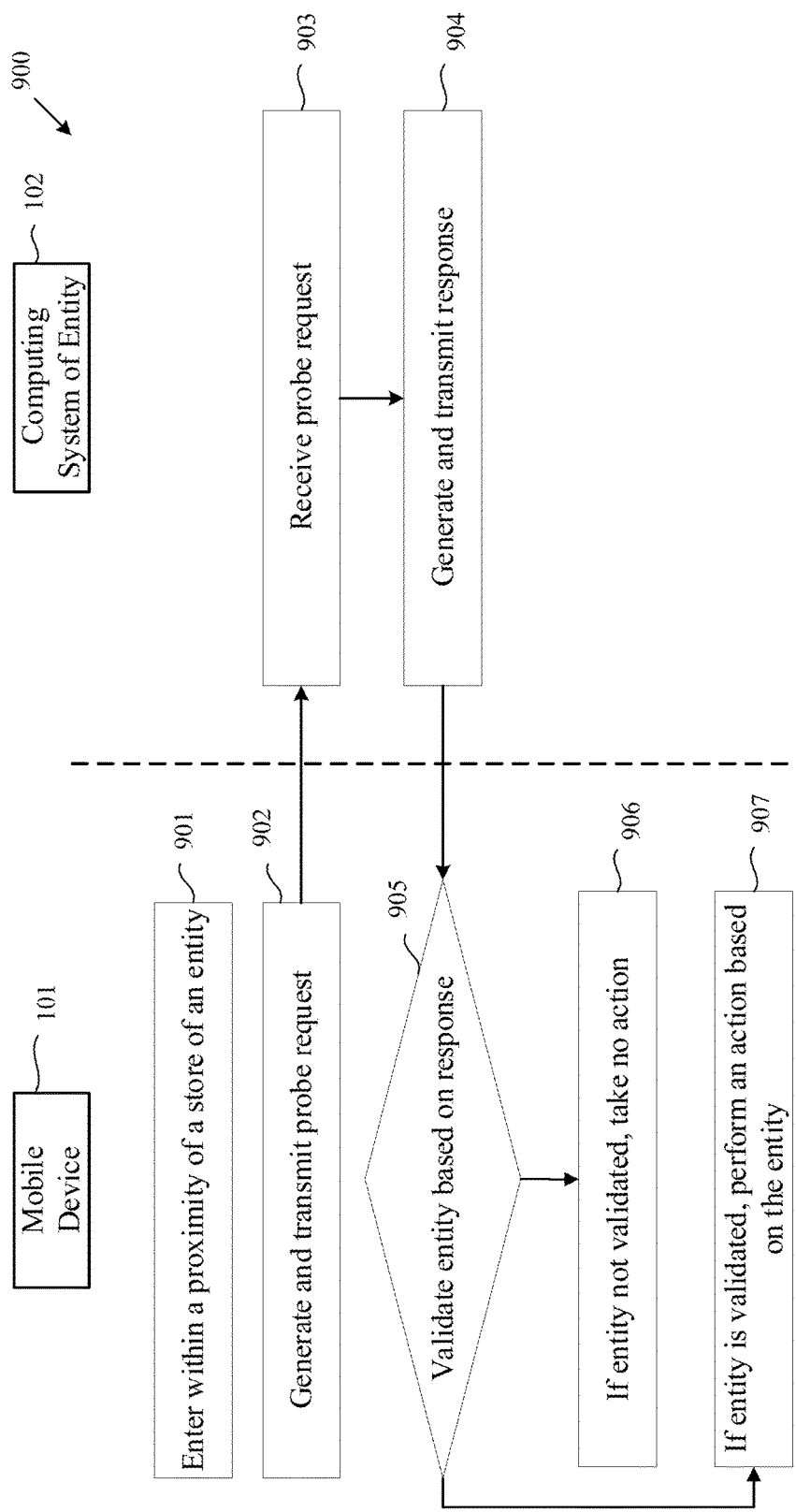
FIG. 9 is a flow diagram depicting a method of anonymized tracking, according to some embodiments.

FIG. 9 is a flow diagram depicting a method of anonymized tracking 900, according to some embodiments. In particular, FIG. 9 depicts a method of a mobile device 102 initially interacting with a computing system of an entity 101. At process 901, the mobile device 102 enters within a proximity of a store of an entity such that the computing system of the entity (e.g., the wireless local area network WLAN infrastructure in the store) communicates with the mobile device 102. At process 902, the mobile device 102 generates and transmits a probe request. The probe request is a general request send out by the mobile device 102 in attempt to probe the surrounding access points or wireless devices. At process 903, the computing system of the entity 102 (e.g., an access point or wireless device of the WLAN) receives the probe request. At process 904, the computing system of the entity 102 generates and transmits a response to the mobile device 102. In some embodiments, the response includes basic information about the WLAN. In some embodiments, the response includes detailed information that is indicative of the store or entity associated with the WLAN. For example, in an embodiment, the response may include a particular tag that identifies the store and/or entity. In one example, the particular take is an anonymized tracking service identification number (ATS ID) located within a field of the response.

At process 905, the mobile device 101 receives the response and validates the entity based on the response. For example, the mobile device 101 may have a client application downloaded onto the mobile device 101. The client application may cause the mobile device 101 to download and store a plurality of ATS ID's in the memory of the mobile device 101. The plurality of ATS ID's are the identification codes corresponding to entities that the user has determined to have permission to track the mobile device 102. In some embodiments, the plurality of ATS ID's are downloaded from the third party computing system 104 in response to the user updating the user profile. In other embodiments, one or more of the plurality of ATS ID's may be received directly from an entity in response to the user enrolling in that particular entities tracking service. In some embodiments, the mobile devices 102 validates the entity by cross-referencing the ATS ID received in the response with the plurality of ATS ID's stored on the mobile device 102. In other embodiments, the mobile devices 102 validates the sending the ATS ID received in the response to the third party computing system 104 (e.g., via a cellular data connection) in order to validate the ATS ID.

At process 906, the mobile device 102 has determined that the entity is not validated and that no action should be taken and the method 900 may end. At process 907, the mobile device 102 has determined that the entity is validated and determines a corresponding action to take. For example, the mobile device 102 may determine that the entity is validated such that the action of the mobile device 102 is to disable MAC randomization. In another example, the action of the mobile device 102 is to connect to the WLAN of the store. In another example, the action of the mobile device 102 is to connect to the WLAN of the store and grant the computing system of the entity 101 permission to track and store information regarding the user and mobile device 102.

It should be understood that no claim element herein is to be construed under the provisions of 35 U.S.C. § 112(f), unless the element is expressly recited using the phrase "means for."

As used herein, the terms "circuit," "processing circuit," "server," and "computing system" may include hardware structured to execute the functions described herein. In some embodiments, each respective "circuit," "processing circuit," "server," or "computing system" may include machine-readable media for configuring the hardware to execute the functions described herein. The circuit may be embodied as one or more circuitry components including, but not limited to, processing circuitry, network circuits, peripheral devices, input devices, output devices, and sensors. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "circuit," "processing circuit," "server," or "computing system." In this regard, the "circuit," "processing circuit," "server," or "computing system" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on).

The "circuit," "processing circuit," "server," or "computing system" may also include one or more processing circuits communicatively coupled to one or more memory or memory devices. In this regard, the one or more processing circuits may execute instructions stored in the memory or may execute instructions otherwise accessible to the one or more processing circuits. In some embodiments, the one or more processing circuits may be embodied in various ways. The one or more processing circuits may be constructed in a manner sufficient to perform at least the operations described herein. In some embodiments, the one or more processing circuits may be shared by multiple circuits (e.g., circuit A and circuit B may comprise or otherwise share the same processing circuit which, in some example embodiments, may execute instructions stored, or otherwise accessed, via different areas of memory). Alternatively or additionally, the one or more processing circuits may be structured to perform or otherwise execute certain operations independent of one or more co-processing circuits. In other example embodiments, two or more processing circuits may be coupled via a bus to enable independent, parallel, pipelined, or multi-threaded instruction execution. Each processing circuit may be implemented as one or more general-purpose processing circuits, application specific integrated circuits (ASICs), field programmable gate arrays (FPGAs), digital signal processing circuits (DSPs), or other suitable electronic data processing components structured to execute instructions provided by memory. The one or more processing circuits may take the form of a single core processing circuit, multi-core processing circuit (e.g., a dual core processing circuit, triple core processing circuit, and quad core processing circuit), microprocessing circuit, etc. In some embodiments, the one or more processing circuits may be external to the apparatus, for example the one or more processing circuits may be a remote processing circuit (e.g., a cloud-based processing circuit). Alternatively or additionally, the one or more processing circuits may be internal and/or local to the apparatus. In this regard, a given circuit or components thereof may be disposed locally (e.g., as part of a local server, a local computing system) or remotely (e.g., as part of a remote server such as a cloud-based server). To that end, a "circuit," "processing circuit," "server," and "computing system" as described herein may include components that are distributed across one or more locations.

An exemplary system for implementing the overall system or portions of the embodiments might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processing circuit instructions and related data (e.g., database components, object code components, script components, etc.), in accordance with the example embodiments described herein.

It should also be noted that the term "input device," as described herein, may include any type of input device or input devices including, but not limited to, a keyboard, a keypad, a mouse, joystick, or other input devices capable of performing a similar function. Comparatively, the term "output device," as described herein, may include any type of output device or output devices including, but not limited to, a computer monitor, printer, facsimile machine, or other output devices capable of performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A method comprising:
    determining, by a processing circuit, a location of a mobile device to be in a building associated with an entity;
    generating, by the processing circuit, a security recommendation for the mobile device based on preferences in a user profile associated with the mobile device with respect to the entity, wherein generating the security recommendation comprises:
        generating a first security recommendation that prevents the mobile device from sharing personal information of a user with the entity in response to the preferences in the user profile comprising a first user preference to opt-out of sharing the personal information of the user with the entity; and
        generating a second security recommendation that allows the mobile device to share the personal information of the user with the entity in response to the preferences in the user profile comprising a second user preference to opt-in to sharing the personal information of the user with the entity; and
    transmitting, by the processing circuit, the security recommendation to the mobile device, wherein the security recommendation comprises instructions that prevent the mobile device from randomizing a media access control (MAC) address of the mobile device, wherein the security recommendation is configured to cause the mobile device to perform an action comprising prompting the user of the mobile device to select to implement the instructions.

2. The method of claim 1, wherein the preferences indicate that the user has opted to not be tracked by the entity, and wherein the security recommendation for the mobile device comprises proxy Wi-Fi credentials configured to allow the mobile device access to a wireless local area network associated with the entity.

3. The method of claim 2, wherein the proxy Wi-Fi credentials are configured to anonymize the mobile device from being tracked by the entity, and wherein the action comprises causing the mobile device to connect to the wireless local area network with the proxy Wi-Fi credentials.

4. The method of claim 1, wherein generating the security recommendation comprises:
   determining, by the processing circuit, an identity of the entity;
   cross-referencing, by the processing circuit, the identity of the entity in the user profile to determine preferences pertaining to the entity; and
   implementing, by the processing circuit, the preferences pertaining to the entity to create the security recommendation.

5. The method of claim 1, further comprising:
   receiving, by the processing circuit from a computing system associated with the entity, tracked location information of the mobile device within the building;
   updating, by the processing circuit, the user profile based on the tracked location information; and
   transmitting, by the processing circuit, information regarding prior location history of the mobile device to the computing system associated with the entity.

6. The method of claim 1, further comprising:
   receiving, by the processing circuit from a computing system associated with the entity, tracked location information of the mobile device;
   determining, by the processing circuit, targeted data for the mobile device based on the tracked location information and the entity; and
   transmitting, by the processing circuit, the targeted data to the mobile device, wherein the targeted data is configured to be displayed on the mobile device.

7. The method of claim 1, further comprising:
   receiving, by the processing circuit from a computing system associated with the entity, an indication that the user associated with the mobile device has made a purchase; and
   updating, by the processing circuit, the user profile to include information indicating that the purchase was made.

8. The method of claim 1, further comprising:
   receiving, by the processing circuit, an indication that the user associated with the mobile device has left the building; and
   updating, by the processing circuit, the user profile to include information indicating that a travel path and time of the mobile device in the building.

9. A method comprising:
   communicating, by a processing circuit of a mobile device via a wireless chip, with a wireless network component associated with an entity;
   transmitting, by the mobile device to a third party server, information regarding the entity, wherein the information regarding the entity is location information associated with the entity;
   receiving, by the mobile device from the third party server, wireless local area networking proxy credentials, wherein the wireless local area networking proxy credentials:
      prevent the mobile device from sharing personal information of a user with the entity in response to preferences in a user profile comprising a first user preference to opt-out of sharing the personal information of the user with the entity; and
      allow the mobile device to share the personal information of the user with the entity in response to preferences in the user profile comprising a second user preference to opt-in to sharing the personal information of the user with the entity;
   accessing, by the mobile device, a wireless local area network of the entity via the wireless network component using the proxy credentials;
   receiving, by the mobile device from the third party server, instructions that prevent the mobile device from randomizing a media access control (MAC) address of the mobile device; and
   prompting, by the mobile device, the user to select to implement the instructions.

10. The method of claim 9, further comprising:
    receiving, at the processing circuit via the wireless network component, targeted data;
    displaying, via a graphical user interface of the mobile device, the targeted data.

11. The method of claim 9, further comprising, in response to receiving the proxy credentials, automatically using the proxy credentials to request access to the wireless local area network.

12. The method of claim 10, wherein the targeted data is received from the third party server via a mobile application installed on the mobile device and associated with the third party.

13. The method of claim 10, wherein the targeted data is received from a computing system of the entity via a mobile application installed on the mobile device and associated with the third party.

14. A method comprising:
    allowing, by a processing circuit of a computing system of an entity, a mobile device to access a wireless local area network of the entity based on proxy credentials used by the mobile device, wherein the proxy credentials:
       prevent the mobile device from sharing personal information of a user with the entity in response to preferences in a user profile comprising a first user preference to opt-out of sharing the personal information of the user with the entity; and
       allow the mobile device to share the personal information of the user with the entity in response to the preferences in the user profile comprising a second user preference to opt-in to sharing the personal information of the user with the entity;
    tracking, by the processing circuit, a location of the mobile device while the mobile device is within communication range of one or more wireless network components associated with the computing system;
    transmitting, by the processing circuit, data indicating the location of the mobile device and associated proxy credentials to a third party server system;
    receiving, by the processing circuit, information regarding the user associated with the mobile device;
    transmitting, by the processing circuit, targeted data to the mobile device, wherein the targeted data is configured to be displayed via a graphical user interface on the mobile device;
    wherein the mobile device receives instructions that prevent the mobile device from randomizing a media access control (MAC) address of the mobile device and prompts the user to select to implement the instructions.

15. The method of claim 14, further comprising determining, by the processing circuit, the targeted data based on the information regarding the user and the data indicating the location of the mobile device.

16. The method of claim 14, wherein the proxy credentials anonymize the user of the mobile device.

17. The method of claim 14, wherein the tracking is executed via the one or more wireless network components and cameras of the computing system of the entity.

18. The method of claim 17, wherein the processing circuit is configured to determine the location of the mobile device based on a known location of the one or more wireless network components and a determination that the mobile device is in communication with one of more of the wireless network components.

* * * * *